May 30, 1967  C. E. FISK  3,321,848
EDUCATIONAL SOLAR ORBIT DEVICE
Filed June 2, 1965  3 Sheets-Sheet 1

Inventor
Carl E. Fisk
by Parker & Carter
Attorneys

May 30, 1967 C. E. FISK 3,321,848
EDUCATIONAL SOLAR ORBIT DEVICE
Filed June 2, 1965 3 Sheets-Sheet 2

Inventor
Carl E. Fisk
by Parker & Carter
Attorneys

May 30, 1967  C. E. FISK  3,321,848
EDUCATIONAL SOLAR ORBIT DEVICE
Filed June 2, 1965  3 Sheets-Sheet 3

Inventor
Carl E. Fisk
by Parker & Carter
Attorneys

United States Patent Office 3,321,848
Patented May 30, 1967

3,321,848
EDUCATIONAL SOLAR ORBIT DEVICE
Carl E. Fisk, Maywood, Ill.
(Rte. 2, Wonewoc, Wis. 53968)
Filed June 2, 1965, Ser. No. 460,707
4 Claims. (Cl. 35—45)

This invention relates to a device which illustrates and teaches various features of the earth's solar position.

A primary object of this invention is a device to illustrate and teach a number of different relationships when a globe simulates a position of the earth in a solar orbit.

Another object is a device which illustrates and teaches by quick and easy manipulation the correct position of a globe at any point of a simulated solar orbit.

Another object is a device which illustrates and teaches, after executing a simple rotation, what portion of the globe is exposed to sunlight at any given position in the solar orbit.

Another object is a device which illustrates and teaches the incidence of the rays of the sun on the globe at any given position in the simulated solar orbit.

Another object is a device which illustrates and teaches the relative time period of daylight for a globe in a given orbital position by means which sense and report such a relative time period.

Another object is a device which illustrates and teaches, in conjunction, the proper position of the earth in its orbit for any day of the year, the area of a globe receiving the incidence of the rays of the sun on that day, and the demarcation line between day and night over the earth's surface, while maintaining the device in correct position so all of the foregoing features can be demonstrated at the various positions of the globe in the solar orbit.

Another object is a teaching and illustrating device which is simple in construction and easy to operate when used together with any globe to represent the earth, whereby the device teaches visually the movements of the sun over the earth's surface.

Another object is to provide a device which is effective when used in conjunction with any globe to simulate the earth and to provide information relating to the position of the sun in relation to the earth at any selected period of the year.

Another object is to provide a device which, when used in conjunction with any globe to simulate the earth, shall simultaneously indicate the area of the earth contacted by the sun's rays and also the points on the earth over which the sun's rays linearly impinge over any selected period of the year and at all periods during the year.

Another object is a device which permits the globe, simulating the earth to be locked in a predetermined position in order to be operable with the device, and which permits such globe to be removed for other uses when not used with the device.

Another object is an educational device which is effective when used with any globe of the earth to display for any period of the year and for all periods of the year, the point of a sunrise and sunset relative to any latitude on the earth's surface.

Another object is a device with simple accommodation means so that the device will show, in conjunction, all the major earth-sun relationships irrespective of the position of the globe in its solar orbit, such earth-sun relationships including the location of the earth in its orbit, the area of the earth receiving the rays of the sun, the dividing line between daylight and darkness and the comparative length of the day and night periods for any latitude.

The foregoing objects are attained along with other objects which will become apparent from reading the following disclosure which includes drawings, wherein.

The use of the same numerals in the various views will indicate reference to the same structures, elements and the like.

Figure 1:
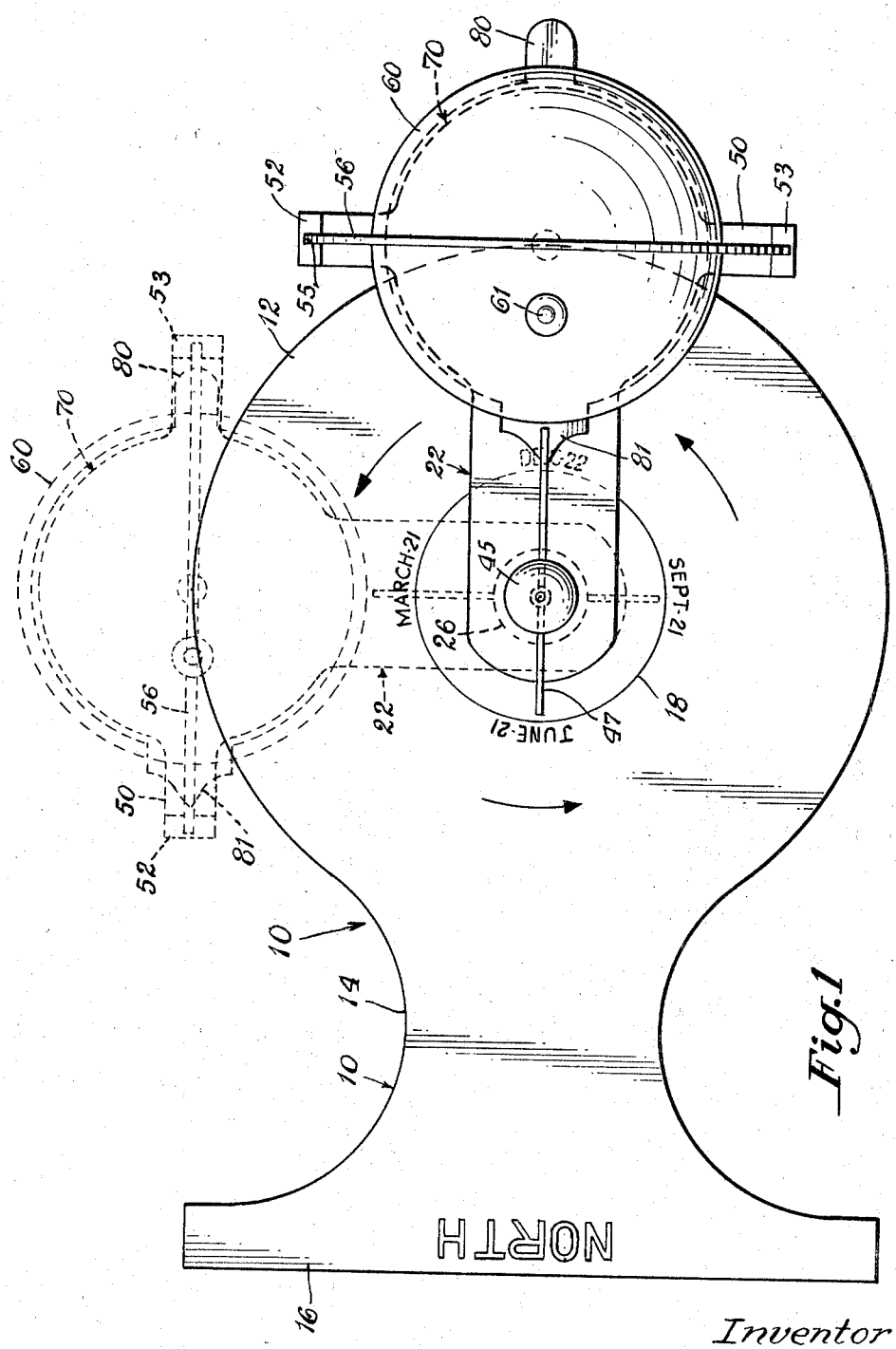
FIGURE 1 is a diagrammatic plan view of the device showing the globe turned to different positions while maintaining the proper position pattern.

The device operates together with a specially formed base shown generally as 10. A substantial portion of the base is circular as at 12, and on such base may be circumscribed an orbit of the globe indicated by the clockwise arrows. A a reduced thickness body or neck 14 joins the circular portion 12 to a target area 16. The target area preferably has a linear length at least as long as the greatest distance within the circumscribed orbit, in this case, generally the diameter of the circular portion 12. The axial tilt of the globe is always directed towards the target area as will be described later in more detail.

A central portion of the circular portion has a continuous indicia or band 18 on which divisions or equivalent markings indicate parts of the solar or calendar year. Thus, the summer and winter solstices are respectively shown as diametrically opposed at June 21 and December 22, and the spring and fall equinoxes are shown as diametrically opposed at March 21 and September 21. The other days of the calendar year can be indicated at the appropriate places on the band 18. An indicator or pointer 20 can be aligned with any division and such pointer is connected to the pivoted end of rotating arm shown generally as 22. Arm 22 is adapted to rotate around the base along the circumscribed orbit indicated by the counterclockwise arrows.

Figure 5:
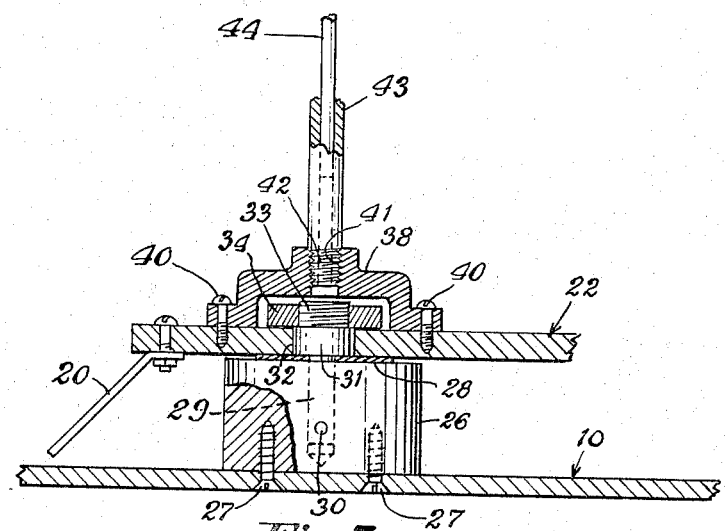
FIGURE 5 is a view along line 5—5 of FIGURE 2.

One end of the arm is pivoted to the base by means which are illustrated in FIGURE 5. The arm pivots on a spacer body section 26 which is secured to circular portion 12 of the base by screw such as 27. A washer or low friction material disc 28 separates the rotatable arm 22 from the body section 26. A shaft 29 is shown as locked in the body section by a pin 30. The shaft has an increased width at 31 around which arm 22 rotates through the accommodation of a slightly increased opening 32. The shaft has a threaded upper part 33 over which is turned a lock nut or the like 34 to prevent the arm 22 from displacement along the axial length of the shaft.

Figures 2, 3:
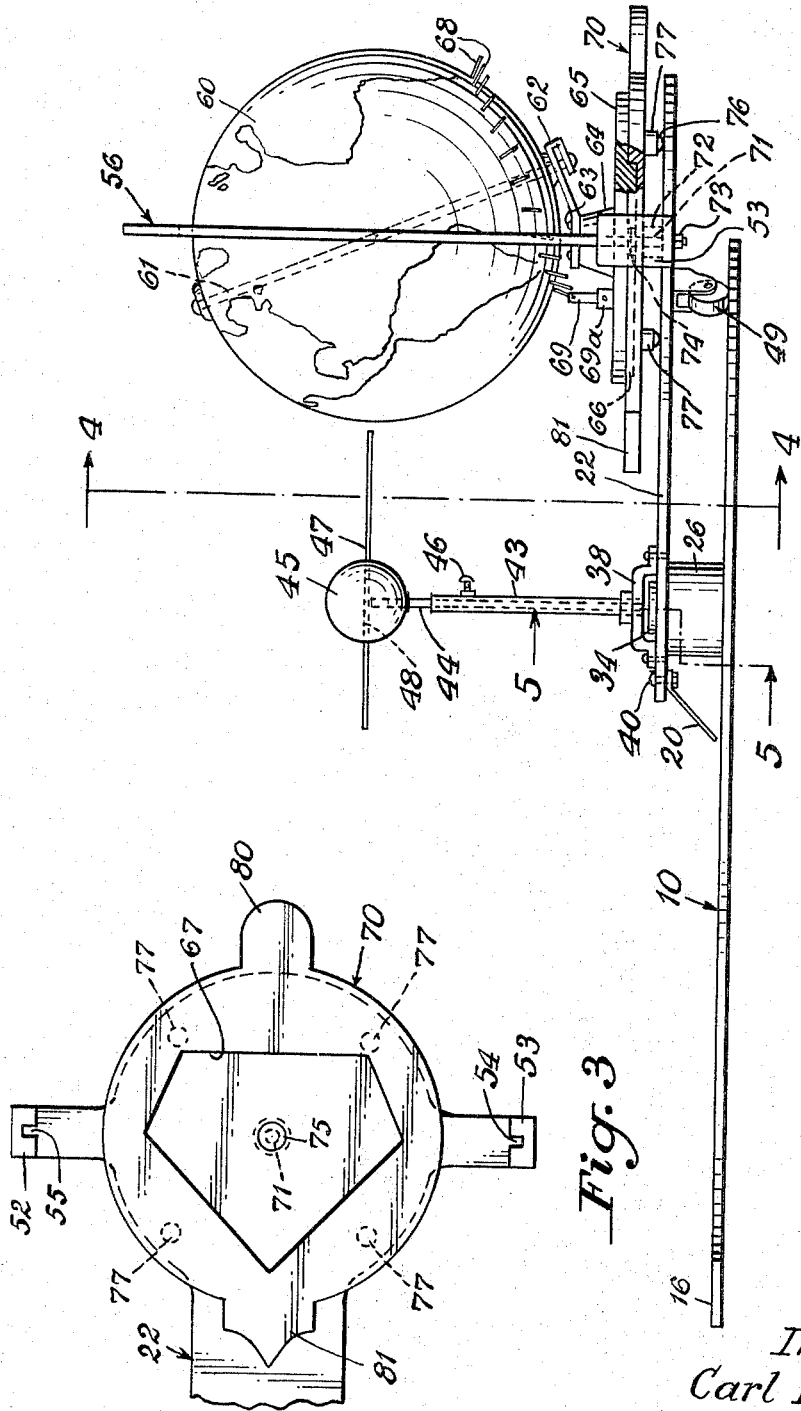
FIGURE 2 is a side elevational view of the device of FIGURE 1 on a reduced scale.
FIGURE 3 is a top plan view of the rotatable platform with parts removed.
Figure 4:
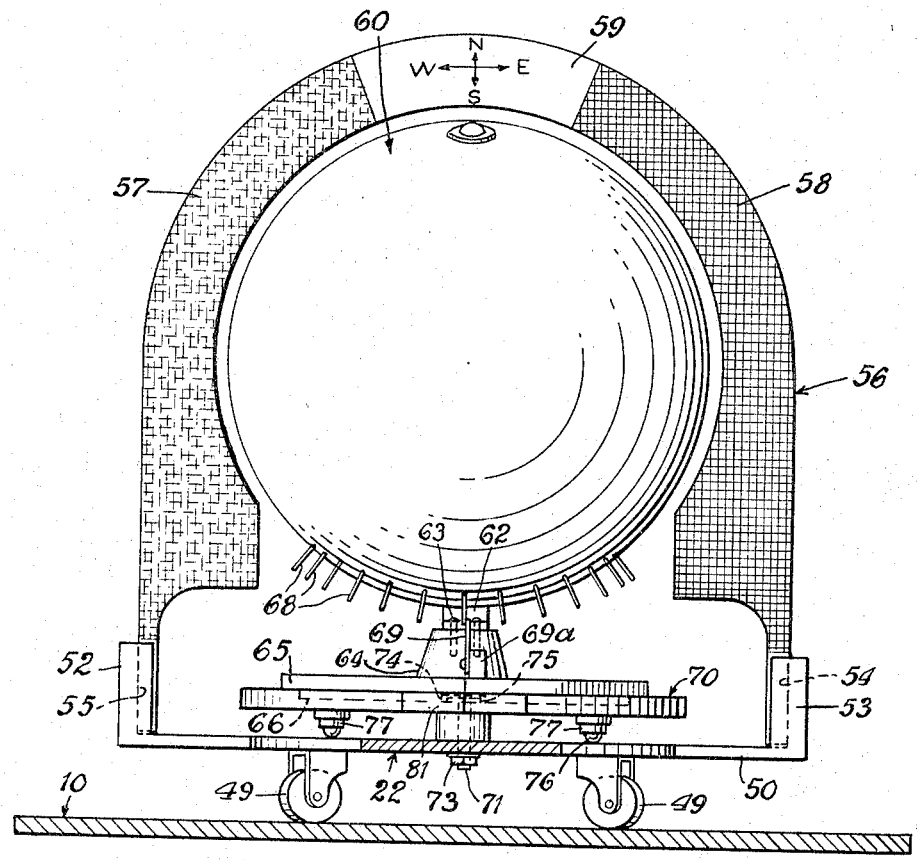
FIGURE 4 is a view along line 4—4 of FIGURE 2.

Fixed above the pivot point is an adjustable rod assembly which includes a base 38 connected to the rotatable arm by screws such as 40. The base has a threaded aperture 41 to engage threaded end 42 of sleeve or tube 43. A rod 44 is adjustably positioned within the sleeve and such rod lowers or raises a sphere 45 which is fixed to the top of the rod in any convenient way. Looking at FIGURE 2, it is seen that rod 44, can be fixed in any adjusted vertical position by set screw 46. The sphere 45 represents the sun and an elongated member or rod 47 represents the linear rays from the sun and their incidence on the surface of the adjoining globe. The rod 47 is horizontal relative to the base but may also be referred to here as representing the vertical rays of the sun relative to the globe. The rod 47 may be securely fixed as by friction in a diametrical opening 48 of the sphere.

The other end of the rotating arm 22 is generally a supporting portion. A plurality of casters such as 49 may be attached to the underside of the supporting portion, and placed in contact with the base to facilitate rotation of the arm. The supporting portion of the arm is shown as modified to form a transverse member 50 which has upright supports 52 and 53 at its opposed ends. The upright supports are slotted as at 54 and 55 to receive and releasably engage the free ends of an arch shown generally at 56. One side of the arch 57 is shown as being differently colored from the other side of the arch 58 so that area 57 can indicate sunrise and area 58 sunset. The reverse side of the arch (not shown) may be in a dark color to represent night-time. Portion 59 of the arch has appropriate indications to show the geographical directions. The arch is easily removed and mounted to facilitate mounting and removal of a globe indicated generally as 60. The arch lies in a plane which is normal to the platform and the base and represents the limits or periphery of the light from the sun on the portion of the globe exposed to such light. At any position of the globe and the base, the side of the arch away from the sphere 45 represents the area of the globe covered by darkness, and the side of the arch towards sphere 45 represents that part of the globe in daylight.

The globe is provided with the usual shaft 61 which is set at the conventional 23½° off center to represent the axial tilt of the earth. The shaft is connected to a bracket 62 which is connected as at 63 to a spacer 64. The spacer is attached by appropriate means to a base 65 which has an underside configuration 66 in the shape of a pentagon. This configuration is locked or keyed in a similarly shaped cutout or socket 67 in a rotatable platform shown generally as 70. If a body and socket interlock is used, any irregular geometric pattern may be used, that is, any pattern which requires a particular alignment with a like pattern.

The platform pivots around shaft 71 which passes through spacer 72 and is fixed against axial movement by nut 73. The pentagonal section may have a cutout as at 74 to accommodate the head 75 of the shaft. A plurality of guide means such as ball and socket arrangements 76 and 77 facilitate rotation of the platform on the supporting portion of the arm 22. The rotatable platform is shown as having a pointer 81 so that the rotatable platform can be registered or oriented in the proper direction relative to the target area 16 of the base 10. Such orientation is necessary to maintain the globe in proper relationship to other structures of the device for any position in a circumscribed orbit.

Towards the south pole of the globe there are a plurality of counters or projections such as pins 68 which form a minor circle relative to the great circle of the equator. Such pins coincide with each 15° meridian and the total number of pins in the minor circle are therefore 24 in number. On the platform is the means to sense and report engagement with the pins when the globe is rotated about its axis. Such means is shown as a substantially resilient tab 69 connected to a block 69a. The block in turn is fixed by any convenient means to the rotatable platform. When the globe is rotated about its axis the tab 69 audibly engages each pin and such engagements can be counted to determine, for example, the time period when a particular place on the globe is exposed to sunlight throughout the day. This would be counted from sunrise at the portion 57 of the arch and continuing up to sunset at portion 58 of the arch.

The use and operation of my invention are as follows:

Many different features may be simultaneously demonstrated in the use of this device. For any particular division of the solar year or day of the calendar year, the area of the globe exposed to daylight is shown as well as the impingement or incident of the vertical rays of the sun on the globe. Likewise, the length of a day can be determined by counting the audible engagements of recording means such as a tab which sense and report the sensed relationship of the tab with counters such as pins upon rotating the globe about its axis. At any position in the circumscribed orbit, the various correct patterns are maintained once the device has been correctly set up.

To make the device operational, a globe with a locking base is interlocked with the locking means on the rotational platform, but such locking means are previously established so that the globe may be correctly oriented on the rotational platform at any place in the circumscribed orbit. Such locking means have been shown as in irregular geometrical pattern or a polygon which receives a similarly shaped base of the globe, but it is understood that other locking means may be used with equal effectiveness. The globe is positioned on the rotational platform so that it is correctly oriented relative to a point 81 on the rotational platform. In this way the platform can always be rotated so that the pointer is directed at a normal direction to the target area 16. The globe will represent the correct axial tilt in simulating the position of the earth in the solar orbit. This target area is conveniently designated as the north geographical direction and the device is best used by setting the base so that target area is aligned with northerly direction.

The orbital position of the earth is changed by rotating arm 22 counterclockwise in the direction of the arrow which likewise simulates the path of the earth in the solar orbit. With every change of the earth's position in the orbit, the platform is turned so that the pointer is again directed at the target area in a normal direction thereto. This is shown in FIGURE 1 where the globe in solid line represents the position of the earth at the summer solstice, the longest day of the year. At this position the user can see what area of the globe is exposed to daylight, and he can further appreciate this relationship by turning the globe on its axis and counting the audible engagement of the tab with the pins. Thus, the user perceives a visible and an audible conception of the length of the day.

Rotating the arm 22 to the position indicated by the phantom outline will align the pointer on the arm with the fall equinox, or a position where the length of the day is equal to the length of the night. This again, will be visually illustrated by the equal division of the globe on both sides of the day-night arch and also by counting the audible engagement of the counter when rotating the globe on its axis. If the globe is moved to a position so that the point 20 is aligned with the December 22 winter solstice, visual inspection would show the shortest day of the year and audible engagement by the counter would confirm such observation. In the equinox position indicated in phantom the position of the handle 80 and pointer 81 represent the position after the platform has been rotated to correctly orient the globe relative to the north target area. If it had not been oriented, then the handle-pointer axis of alignment would be positioned 90° away from the illustrated position. This would not permit correct use of the device.

The vertical rays of the sun or the incidence of the sun rays on the globe's surface is also illustrated by the device. This is set by positioning the pointer 20 of the rotated arm to either the spring or fall equinox, and then adjusting rod 44 until horizontal member 47 coincides with the equator. The set screw 46 is locked in position and the relationship of the horizontal member and the globe, which simulates the incidence of the sun's rays on the earth, are operable throughout the various demonstrations of the device.

By rotating the globe at the equinox, it will be seen that the vertical rays of the sun coincide with the equator. After moving the globe to the summer solstice, and correctly orienting the rotational platform area relative to the target area, it will be seen that the sun's rays coincide with the Tropic of Cancer, which is 20° north of the equator. Moving the globe to the winter solstice, and orienting the platform in a direction normal to the target area, will show that the sun's rays coincide with the Tropic of Capricorn which is 20° south of the equator.

The winter and summer solstice, of course, represent the extreme sweep of the sun, respectively, north and south of the equator, and any calendar positions therebetween will show exactly where the vertical rays of the sun impinge on the surface of the globe. In such a way, the user can correlate the time of the day according to his watch with the place on the globe where the vertical rays of the sun impinge. The device will also demonstrate the exact point in the easterly direction where the sun rises, and the point in the westerly direction where the sun sets. This is not always true east and true west as will be illustrated during the longer summer days when the sun is shown to set slightly south of west, and during the shorter winter days the sun is shown to set slightly north of west. Other features will be clearly demonstrated by the device.

It is an important feature that any type of globe can be used with the device so long as it has a base provided with locking means which will interlock with the means of the rotational platform. The globes may be different sizes and, accordingly, the rod 44 may be adjusted to set the horizontal member with the equator of the particular size globe at one of the equinoxes. Such a globe may also be removed when the device is not being used and the globe may be independently and separately used for any of the number of reasons which it normally serves. The arch may be removed by disengaging its ends from the releasable means when it is desired to use the device without the arch for greater handling convenience, for greater ease in mounting and removing the globe, and for unimpeded illustration of particular features.

The foregoing invention can now be practiced, and such practitioner will know that the invention is not necessarily restricted to the particular embodiments presented herein. The scope of the invention is to be defined by the terms of the following claims as given meaning by the preceding description.

I claim:

1. A globe to illustrate the position of the earth relative to the sun during different times of the solar year which includes, in combination, a substantially planar base in which a major portion is an area over which a globe is adapted to circumscribe an orbit, and a minor portion is a linear target area outside the circumscribed orbit but at least of a length equal to the greatest side to side distance within the orbit, a rotatable arm pivoted at one end to a central portion within the circumscribed orbit, the other end of the arm being a supporting portion which is adapted to follow the circumscribed orbit, a continuous indicia band around the pivoted end of the arm, said band having markings to represent various divisions of the calendar year to correspond to positions of the globe in the solar orbit, an indicia pointer on the pivoted end of the arm adapted to be aligned with on of such divisions, the supporting portion of the arm having a rotatable, substantially circular platform, said platform pivoted at a substantially central portion to the supporting portion of the arm, a pointer on the platform, a transverse member extending to each side of the supporting portion of the arm, said transverse member having releasable holding means at its opposed ends, an arch having opposed free ends adapted to engage the releasable means at the opposed ends of the transverse member, said arch lying in a plane which is normal to the platform, a globe adapted to be mounted on the platform at an axial tilt corresponding to 23½, locking means on the platform, locking means on the base of the removable globe adapted to interlock with the locking means on the platform so that the globe is correctly tilted towards a target area when the platform is rotated to direct the platform pointer at a direction normal to the target area, a vertically adjustable rod towards the pivoted end of the arm, a horizontal member fixed to the top of the vertically adjustable rod so that the member may be directed at the equator during an equinox position of the globe to correctly simulate incidence of the sun's rays on the globe, projecting counters on each meridian of the globe towards the south pole, said counters in the aggregate circumscribing a minor circle relative to the great circle circumscribed by the equator of the globe, a resilient intercepting member fixed to the base of the globe, and said member adapted to audibly contact each counter when the globe is rotated upon its axis, whereby the globe is correctly positioned at its correct axial tilt following orientation by rotating the platform, and the area of the globe exposed to sunlight is shown by the division of the arch along the meridian, the relative time of daylight is indicated by counting the audibly reported interceptions when rotating a given point on the globe throughout the daylight area of the arch, and the simulated incidence of the horizontal rays of the sun is indicated.

2. A device to illustrate the position of the earth relative to the sun during different times of the solar year, which includes, in combination, a substantially planar base, a rotatable elongated arm mounted on said base, one end of the arm pivoted to a generally central portion of said planar base on an axis at right angles to said base, the other end of the arm being a supporting portion adapted to follow a circumscribed orbit on said base, a target area on said base extending outwardly of said orbit, a simulated sun positioned along said axis of said arm, an idler platform rotatably mounted on said arm supporting portion on an axis parallel to said axis of said arm, means on said platform to manually rotate said platform independently of said arm, a pointer on the platform adapted to be directed towards the target area upon rotation of said platform, a simulated earth globe mounted on a flat, standing base on an axis inclined to said standing base to represent the axial tilt of the earth, a seating area on said platform adapted to receive said standing base in a fixed position relative to said pointer, said standing base having a substantially flat bottom surface adapted to support said globe on said platform, one of said standing base and seating area having a non-circular portion, a non-circular socket means on the other of said seating area standing base, and said standing base adapted to be directly received by said seating area so that said socket means and non-circular portion cooperate to fix the position of said globe relative to said platform pointer, whereby said arm may be rotated to be aligned with a given calendar designation, and the globe may be thereafter correctly positioned by rotating said platform until the platform pointer is directed towards said target area, and whereby said standing base and globe may be readily mounted on said seating area and be readily removed therefrom so that said globe may be used on supports other than said rotatable platform.

3. A device as in claim 2 further characterized by and including a plurality of projecting counters on said globe, said counters circumscribing a minor circle relative to the great circle of the equator, and a senser member mounted on said standing globe base in an intercepting relationship with said counters, whereby clock time can be audibly sensed and reported for daylight and nighttime by rotating the globe about its axis at any position of the globe in the solar orbit.

4. A device as in claim 2 further characterized in that said non-circular socket means is on said platform and is a polygon pattern having at least three sides, said sides being raised relative to the plane of said polygon, said standing base of said globe being non-circular and having a matching polygon configuration to allow said globe base to be seated within the raised sides of the polygon pattern in said platform, a plurality of projecting counters on said globe forming a minor circle towards the south pole relative to the great circle of the equator, a resilient senser member mounted on said globe base in an intercepting relationship with said counters, and each counter projecting from a separate meridian on said globe so that twenty-four hour clock time can be audibly sensed and reported for daylight and nighttime by rotating the globe about its axis at any position of the globe in the solar orbit.

References Cited

UNITED STATES PATENTS

| | | | |
|---|---|---|---|
| 184,546 | 11/1876 | Rose | 35—45 |
| 254,229 | 2/1882 | McDonough | 35—45 |
| 291,698 | 1/1884 | Davis | 35—45 |
| 452,413 | 5/1891 | Moore | 35—45 |
| 480,367 | 8/1892 | Hallet | 35—46 |
| 647,252 | 4/1900 | Costello | 35—45 |
| 770,370 | 9/1904 | Houston | 35—45 |
| 959,987 | 5/1910 | Baritt | 35—45 |

FOREIGN PATENTS

| | | |
|---|---|---|
| 7,264 | 1914 | Great Britain. |
| 182,272 | 7/1922 | Great Britain. |

JEROME SCHNALL, *Primary Examiner.*